Oct. 4, 1960 — A. W. BAUMANN ET AL — 2,954,821
STERILE VACUUM PAN
Filed April 23, 1954 — 3 Sheets-Sheet 3
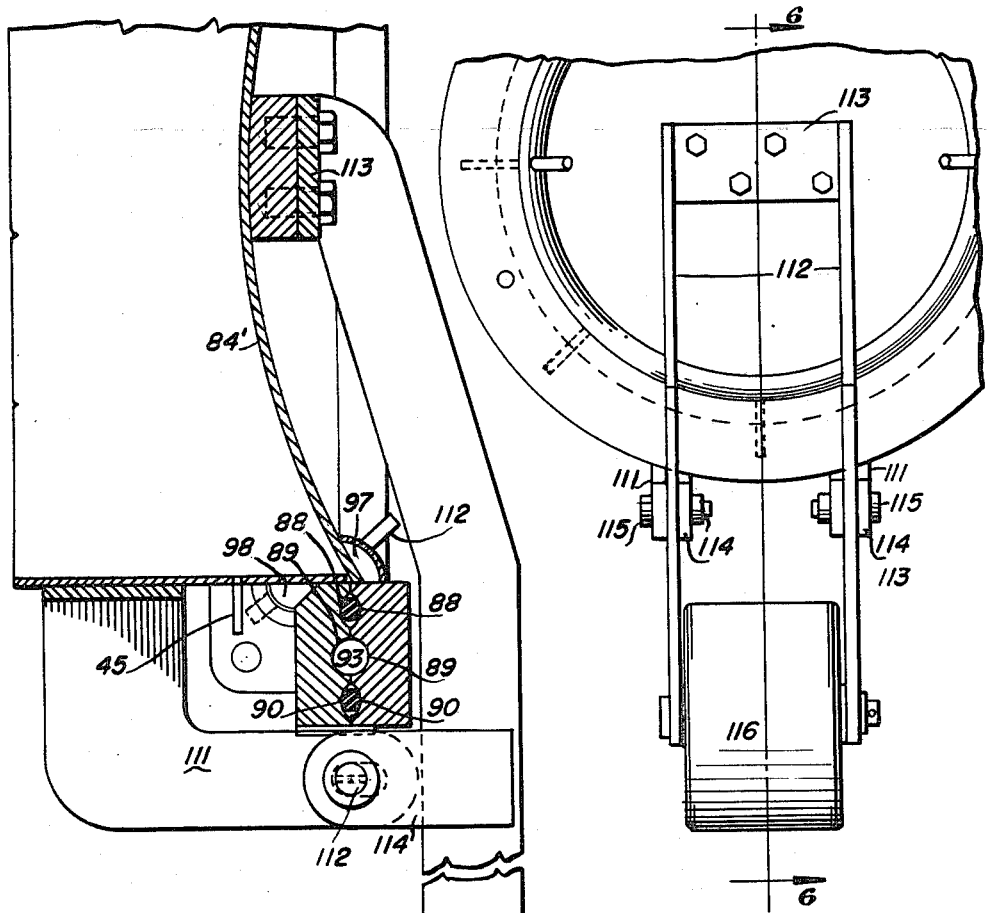
FIG.6.  FIG.5.
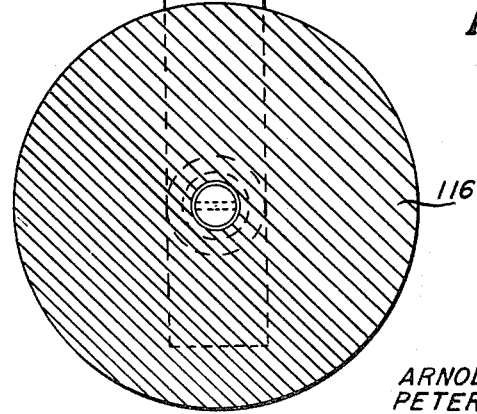
INVENTORS
ARNOLD W. BAUMANN
PETER P. NOZICK
ROBERT H. BUNDUS
GERALD C. NORTH
BY Cushman Darby & Cushman
ATTORNEYS

United States Patent Office 2,954,821
Patented Oct. 4, 1960

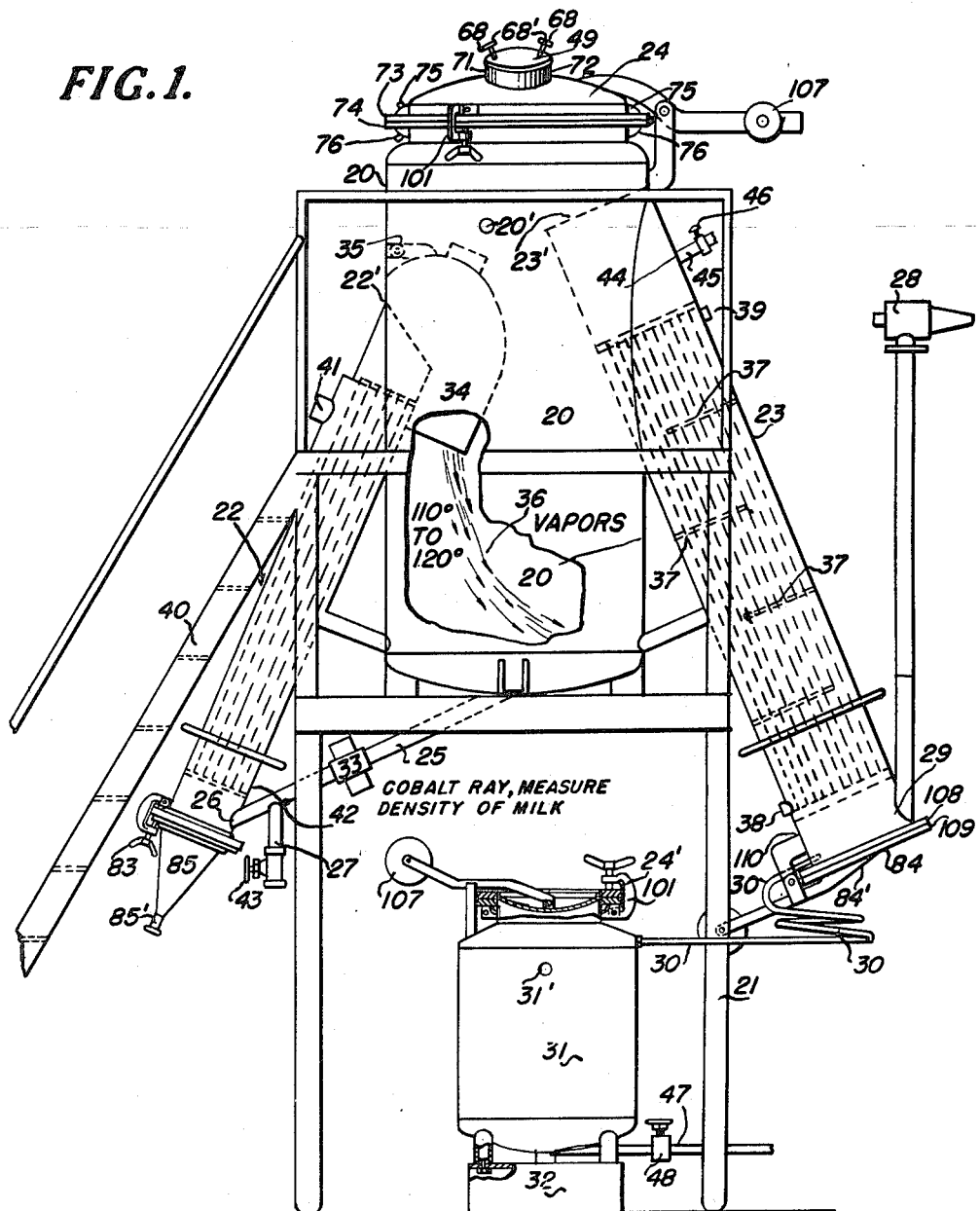

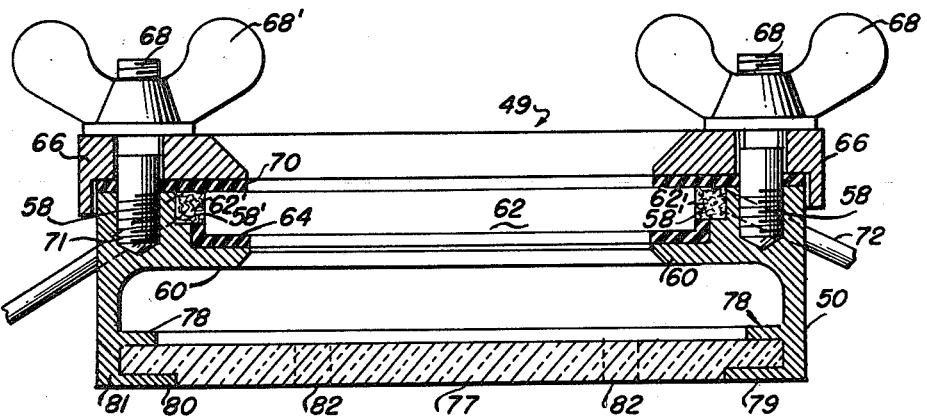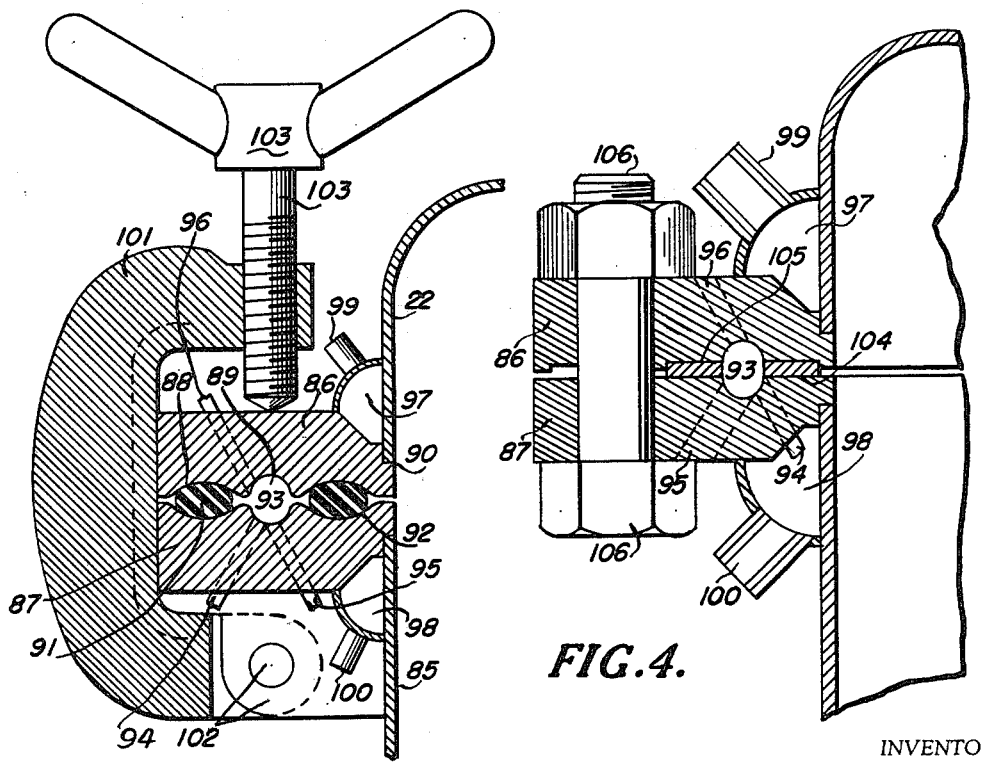

2,954,821

STERILE VACUUM PAN

Arnold W. Baumann, Peter P. Noznick, Robert H. Bundus, and Gerald C. North, all % Beatrice Foods Co., 1526 S. State St., Chicago, Ill.

Filed Apr. 23, 1954, Ser. No. 425,104

7 Claims. (Cl. 159—1)

The present invention relates to an improved method and apparatus for the sterile handling and treatment of liquids, particularly milk and similar dairy products. The invention relates particularly to a method and apparatus including an improved product concentrating apparatus and process for operating the same, wherein the product is maintained within a closed system sealed against the ingress of product-contaminating agents.

More generally, the present invention relates to an improved method and apparatus for the sterile treatment and concentration of liquid products such as milk, cream and pharmaceuticals wherein the sterile concentrated product retains its stability and usefulness over extended periods of time without refrigeration, and can be subsequently reconstituted with water and have the taste, body and color of the normal whole product. That is, the reconstituted product will have the properties of the normal whole product; but, unlike present day concentrated sterilized products, it is devoid of their highly objectionable and characteristic cooked flavors.

More specifically, the present invention relates to an improved sterile vacuum pan concentrating apparatus associated with other product treating and handling devices forming a closed treating system having novel and effective seals for the connections, couplings, valves and fittings of the system to maintain the product sterile and free of any contaminating agents. Additionally, this invention relates to an improved method for operating the vacuum pan concentrating apparatus and associated system for treating liquid products.

Natural liquids containing organic material such as milk and milk products, once freed of their source, rapidly undergo physical and chemical changes under the influence of oxidation, heat and the action of bacteria.

Known methods and apparatus for treating liquids of the type described including vacuum pan concentrating apparatus have failed to produce sterile concentrated products which could be reconstituted with water and have the taste, body and color of the normal whole product.

It is an object of our invention to provide a method and apparatus for treating and concentrating liquids under sterile conditions in a rapid and economical manner and without any detrimental, bacteriological, chemical or physical changes.

Another object of our invention is to provide an improved method and apparatus for concentrating and handling liquids within a closed treating system having novel and effective seals for the connections of the system to maintain a sterile, substantially isolated and inert atmosphere, within the treating zones.

Another object of our invention is to provide an improved process or method of treating and handling liquids, such as milk, in a closed treating system, including rapid and efficient internal sterilization of the equipment and continuous external sterilization of all points of possible leakage of the system, either inwardly or outwardly of the same.

A further object of our invention is to provide an improved process of concentrating and handling liquid products wherein the concentrated liquid is maintained free of contaminating agents and in which the evaporated portion or component of the liquid is condensed and processed such as by measuring the amount of liquid extracted from the concentrated product and examining the physical, bacteriological and chemical properties of the concentrated product.

Another object of the invention is to provide a continuous process of concentration by continuously testing or measuring the density of the concentrated product, for example, as it issues from the vacuum pan using for this purpose, Cobalt Ray Equipment as manufactured by the Ohmart Corporation of Cincinnati, Ohio.

A still further object of the present invention is to provide a vacuum pan type concentrating apparatus of the type described which is easily scrubbed and cleaned of all traces of product or foreign materials and which may be rapidly and efficiently sterilized and maintained in a sterile condition throughout the operation of the same.

Another object of this invention is to provide apparatus of the type described for concentrating and handling liquid products wherein seals in the form of jackets enclose the various connections of the apparatus and are interconnected whereby a vacuum may be created therein or within which sterile steam or inert gases, such as nitrogen and bactericides, in mist or similar form may be circulated.

Another object of the present invention is to provide an improved method which may be employed either as a batch or continuous operation for concentrating and handling liquids wherein the degree of concentration of the liquid may be carried to any desired extent without loss of values and in which the liquid is maintained under sterile conditions at temperatures which are not detrimental to the taste, color, body, or the physical and chemical characteristics of the same.

With the above and other objects in mind, reference is made to the accompanying drawings wherein two embodiments of the apparatus of the present invention are illustrated, and in which:

Figure 1 is an assembly view, in elevation, illustrating the preferred form of vacuum pan type concentrating apparatus including an associated product heater, vaporized product condenser and measuring device;

Figure 2 is a cross-sectional view of a sealed peephole associated with a manhole closure of the apparatus;

Figure 3 is a cross-sectional view illustrating a type of seal employed for maintaining sterile conditions within couplings and fittings of the apparatus, notably, the closure of the vacuum pan, the connection between the evaporator tube chest and its reducing cone, the bottom cover plate of the condenser tube chest, and the cover of the weight tank, respectively, and any other places where a sterile seal is necessary to assure sterile conditions in the vacuum pan at all times;

Figure 4 is a cross-sectional view illustrating a modified seal structure also employed for maintaining sterile conditions within couplings, fittings, etc. of the apparatus, as described in connection with Figure 3;

Figure 5 is an end view of the closure assembly of the vaporized material condenser; and Figure 6 is a cross-sectional view along the line 6—6 of Figure 5, illustrating the condenser end closure.

General description

The vacuum pan apparatus of our invention is employed in a closed liquid handling and treating system and is utilized for concentrating liquids, such as milk and milk products. The entire interior of the system, including the interior of the vacuum pan apparatus, is maintained in a substantially isolated and sterile atmosphere devoid of contaminating agents. Preferably, the vacuum pan concentrating apparatus is utilized, after the product has been sterilized, for concentrating the product under sterile conditions and within temperature ranges which are not detrimental to the physical and chemical properties of the product. Therefore, the vacuum pan concentrating apparatus of our invention usually receives a product to be concentrated, in a sterilized condition, and concentrates the same to the desired degree and delivers the concentrated portion of the product to a packaging instrumentality wherein preferably the material is discharged into packages or receptacles under sterile conditions. The evaporated or vaporized portions of the product will be withdrawn separate from the concentrated liquid and the condensable component liquefied, measured and processed for comparison to the original whole product to determine the amount of concentration. Also, if desired, particularly in a continuous concentration treatment, the density of the concentrated liquid as continuously recovered from the vacuum pan, is measured by said Cobalt Ray Equipment, to thereby determine and control the concentration.

The drawing illustrates an apparatus and process for either batch or continuous operation.

Referring to Figure 1, the vacuum pan, which is illustrated as a whole at 20, is mounted upon any suitable elevated supporting structure 21. The pan is provided with an inclined inlet leg 22 for liquid to be concentrated and a similarly inclined outlet leg 23 for carrying off and condensing vapors. The legs respectively open into the pan at 22′ and 23′ and these openings are so located and inclined that they can be readily reached upon raising the cover 24 of the vacuum pan. This availability of the legs for cleaning is of substantial importance and enables both legs and interior of the pan to be cleaned from a single opening at the top of the vacuum pan, i.e., by reason of the proximity of the openings 22′ and 23′ to the cover 24 and the inclination of the openings 22′ and 23′ to the vertical, as shown.

At its bottom, the vacuum pan is provided with an outlet conduit for concentrate, indicated at 25, which is connected to the inlet leg 22, as shown at 26 for returning concentrate to the pan for further concentration where desired. This outlet conduit 25 also has an outlet, as shown at 27, for continuously removing concentrate from the pan to a subsequent processing instrumentality by means of a sterile pump, e.g., a flood centrifugal pump, not shown. A variable speed pump is used so that, as the evaporation rate changes, the pump can be adjusted accordingly. All of the concentrate may be removed through conduit 27 or only a part thereof, the remainder continuing to circulate through leg 22 back to the pan 20, in either instance, the operation being continuous, if desired. The inlet leg 22 is provided with a conventional heat exchange means, while the outlet leg 23 is provided with a suitable condensing means for vapors which are carried off through the leg. A vacuum is initiated in the pan 20 by any suitable means, such as a steam ejector nozzle 28, which communicates with the lower or outlet end of the vapor and condensate outlet leg 23, as shown at 29, and after the vacuum is so established, it is maintained and assisted by the condenser 23. Any air or noncondensable gases which come into leg 22 with milk will be removed by the ejector 28, which continuously operates. The lower end of the outlet leg 23 has a pipe 30 leading therefrom whereby condensate is delivered to a weigh tank 31 mounted below the lower end of the outlet leg 23 as shown and supported upon a suitable scale 32 whereby the amount and rate of concentration may be readily determined and measured, particularly where the apparatus is used for batch concentration. Where the apparatus is used for continuous concentration, this is readily accomplished by disposing suitable Cobalt Ray Equipment 33 as made by Ohmart Corporation, Cincinnati, Ohio, in the outlet line 25, as shown, which will measure the density of the concentrate product as it continuously flows through the outlet line 25, either to the inlet leg 22 for return to the pan, or out through the outlet 27. The Cobalt Ray Equipment 33 may be used when the operation is by batch. Also, when the operation is continuous, the conduit 30 need not lead to the tank 31—32, but to a barometric leg. The numeral 31′ indicates a valved port for introducing steam to sterilize the interior of the weigh tank 31.

It will be noted that at the point where the inlet leg 22 opens into the vacuum pan there is provided a shield or deflection hood 34 of substantially hemispherical formation. This hood is hingedly mounted, as shown at 35, on the wall of the vacuum pan, and the hinge is of the conventional removable type, so that the hood may be taken out and cleaned when desired. The presence of the hood assures that the liquid to be concentrated, such as milk and vapors entering the pan from the inlet leg opening, are directed downwardly, as shown at 36, so that the milk and vapors will readily separate within the vacuum pan, below the entrance end 22′ of the inlet leg 22 and the exit end 23′ of the outlet leg 23, and thereby reduce to a minimum the possibility of entrainment of the liquid in the vapors which are carried out through the leg 23. The hood 34 thus acts as a baffle to preclude the product entering the vacuum pan from being carried over directly to the opening 23′ of the outlet leg 23. Such product comprises approximately 5% milk and 95% vapor as it enters the vacuum chamber at 22′, and it is, therefore, important that this mixture be directed downwardly, as shown at 36, so that sharp and adequate separation of the vapor and liquid phases may be accomplished without objectionable entrainment. The liquid, e.g., milk which enters the vacuum pan 20 at the inlet opening 22′, is flash cooled, usually to 110° to 120° F. The valved opening 20′ in tank 20 is like the opening 31′, i.e., to permit introduction of steam to sterilize the interior of the vacuum pan 20.

It will be noted that the condensing leg 23 is of the baffle type, being provided with baffles 37, about which circulates the cooling water which continuously enters at the port 38, circulates upwardly about the baffles and tubes of the leg 23, and is continuously removed through the port 39, whereby the cooling water mixes to assure a uniform or even cooling temperature in the condensing leg 23.

The heating leg 22 is also of the tube or heat exchanger type, low pressure steam, e.g., 5 to 7 pounds gauge, being continuously introduced at the port 41, circulated over the tubes containing the milk flowing up the leg 22 in the tubes, and the condensed steam being continuously withdrawn through the port 42 at the bottom of the leg.

To facilitate the necessary cleaning, inspection and repairs of the vacuum pan apparatus, a conventional ladder or step assembly 40 is provided, associated with the vacuum pan supporting structure 21.

It will be noted that in a batch operation, the concentrate flows by gravity through outlet conduit 25 to leg 22 and the condensate flows by gravity from leg 23 through the coil 30 or pipe to the tank 31 which is located below the vacuum pan, as shown. Where continuous operation of the pan is utilized, a sterile pump, as stated above, is connected to the outlet 27, and by reason of the use of the Cobalt Ray Equipment 33 in the line 25, the condensate need not be additionally checked, and may be allowed to pass off to a drain through a barometric leg connected to the pipe 30 and containing sterile condensate or a high vacuum sterile pump may be used, as above described, and connected to the pipe 30.

Referring to Figure 1, the valve 43 on the outlet 27 is used to shut off flow through outlet 27 when it is desired to direct all or a part of the flow back into the leg 22 for re-circulating the concentrate. If desired, the valve 43 may be disposed in the conduit 25 instead of in the outlet 27. The purpose of the valve 43 is to permit the vacuum pan to be readily adapted from batch to continuous and vice versa. The concentrate from the pan 20 may continuously flow off by gravity through conduit 25 or be drawn off after the concentration operation is completed.

As previously explained, by inclining the heat exchange units or legs 22 and 23 and having their ends within the chamber 20 inclined toward the top opening of the pan in close proximity to its cover 24, it is possible to remove the cover 24 and clean the pan and the heating and condensing units 22 and 23 through a single opening, namely, the said top opening of the vacuum pan, thereby eliminating at least two conventional openings which heretofore have been thought necessary to assure proper cleaning of the vacuum pan.

Referring to Figure 1, there is positioned on the leg 23 adjacent the upper or inlet end 44 thereof a port 45 with valve 46, which communicates with a source of sterile air, such as a sterile air machine, not shown, whereby the vacuum in the pan and system can be broken using sterile air.

Leading from the condensate weigh tank 31 is an outlet pipe 47 provided with a valve 48. The pipe 47 and valve 48 are maintained sterile since the condensate itself in the tank 31 is sterile and keeps sterility in the line and valve as it passes therethrough.

*Preferred apparatus sterilization and seals*

The sterilization and sealing of the external portions of the connections, couplings, valves and fittings constitutes an important feature of the present invention. The various couplings, valves and other connections throughout the entire system and particularly in connection with the vacuum pan concentrating apparatus, are enclosed in seals having the form of jackets or casings which may be supplied with superheated and preferably saturated steam or sterile gas under pressure or within which a vacuum greater than the vacuum in the concentrator or vacuum pan apparatus 20 can be maintained. Additionally, whenever sterile steam or heated inert sterile gases are provided within the sealing jackets and surrounding the fittings and connections, we utilize additional cooling jackets or enclosures associated with the fittings and connections through which cooling fluid may be circulated to prevent the liquid undergoing treatment in the pan from being subjected to excessive temperatures and heat.

This unique manner of sealing and enclosing the couplings and connections, and the like, within seals, e.g., jackets or casings, eliminates the possibility of foreign agents contaminating the sterile liquid undergoing treatment and makes the vacuum pan truly sterile. With the use of steam or inert gas, such as nitrogen, at pressures higher than atmospheric pressure, any tendency of the apparatus to leak will result in sterile steam or sterile gas, free of contaminating agents, entering the system. Whenever a vacuum is maintained within the sealing jackets or casings, the same is of higher degree than the vacuum in the pan and any leak in the system will result in either a leakage of the product out into the jacketed areas from the system, or if contaminating agents leak into the high vacuum area of the jacket, they will be instantly and continuously removed by the vacuum-creating means. Additionally, the sealing jackets or casings of the external couplings and connections may be pre-sterilized by running saturated or super-heated steam through all of the jacketed areas for periods up to thirty minutes or longer, if desired. Subsequently, the steam may be replaced by bleeding in hot sterile air to produce a pressure greater than atmospheric, thereby sweeping out all residual steam and droplets of sterile moisture which have collected in the jacketed portions of the valves, connections, joints, etc. Such locations may be maintained sterile in a number of ways. For example, a suitable non-toxic bactericide may be continuously sprayed into the sealing jackets and any condensation collected and drained. Additionally, a circulating system may be utilized to continuously spray the mist and remove any collected liquid portions thereof from the casings. It will be understood that the methods just described may be utilized upon any of the joints, manholes, sight openings, valves and connections in the various equipment employed in carrying out the invention. The important consideration is to make certain that the sterilized product, such as milk, will be maintained sterile throughout the entire system, and the concentrated product will be delivered in a sterile condition to a sterile packaging instrumentality.

The internal portions of the system will be sterilized preferably by circulating saturated or super-heated steam throughout the vacuum pan and the associated elements of the system for periods up to thirty minutes or longer, if desired. In actual operation the initial treatment of the entire system to maintain both the external and internal portions thereof sterile are conducted simultaneously.

Although the specific construction of sealing jackets and casings surrounding the fittings and couplings connecting the apparatus may assume any desirable form of construction, the sealing jackets and casings for both the sterile inert gases and sterile steam, as well as the cooling jackets and casings for the cooling fluid, as shown in Figures 2 through 6 of the drawings are preferred.

The manhole cover 24 is provided with a peephole 49 provided with a sight glass, as shown in Figures 1 and 2. The peephole structure 49 includes a hollow cylindrical boss 50 having an internal bore 58 provided with an inwardly extending shoulder or ledge 60. The passage through the peephole is adapted to be sealed by a transparent member 62 received upon a gasket 64 carried by the ledge 60 within the bore 58 of the boss. The transparent member 62 is held in place by a clamping ring 66 securely clamped into sealing position by conventional clamps, such as wing nut clamping screws 68—68'. Preferably, a gasket 70 of ring-like formation is interposed between the clamping ring 66 and the upper adjacent flat ring-like surface of the hollow cylindrical boss and the transparent member 62, as shown in Figure 2.

Referring to Figure 2, it will be noted that the bore 58 is provided with a closed circular sealing passageway 62' surrounding the transparent member or glass 62. This passage is defined by the outer periphery of the glass disc 62, the inner wall portion 58' of the bore 58 and ring gaskets 64 and 70. Leading into this passage is a conduit 71, shown in dotted lines, and leading from the recess is a second conduit 72, by which steam, gas, air or other sealing medium may be circulated through the seal 62' to effectually avoid contamination of the vacuum pan and products therein, as above-described. A vacuum may also be created in the passage 62' by closing the valve of one of the ports 71 or 72.

There is thus provided at the manhole sight opening a seal which will avoid the entrance of contaminating influences to the vacuum pan. That is, the circular chamber or jacket 62' in the boss 58, which is defined by the gaskets 64 and 70, the transparent member 62 and the wall of the boss 58, is formed into a seal or jacket in which the super-heated steam or saturated steam is constantly circulated or sterile air is introduced or a bactericide is introduced, as above-described. Also, the circular chamber 62' may be evacuated at a higher vacuum than is present in the vacuum pan, also as above-described.

Further referring to Figure 2, since splashing may occur in the operation of the vacuum pan, there is provided, where necessary, a shield or splash glass 77 which is removably disposed in the boss 50 being carried between an upper circular inwardly fixed flange 78 and lower inwardly extending circumferentially spaced lugs 79, one or more 80 of which are swingingly mounted as at 81 on a pin or other pivoted means so as to allow the glass 77 to be removed for cleaning and replaced as desired, or the glass may be provided with circumferential recesses 82 which extend radially inward, whereby the glass may pass the fixed lugs 79 by registering the lugs 79 and recesses 82 and then the glass is twined to bring the same out of register and support the glass on the inner upper surfaces of the lugs.

The boss 50 of sight opening 49 and associated parts extend at an angle to the horizontal so as to assure that any material collecting on the glass 77 or possibly on the transparent member 62 will flow outwardly and downwardly on the same and not tend to collect and fog the sight opening.

The seal or jacket 62' may contain a steam or inert gas, such as nitrogen, at pressures higher than atmospheric pressure so that if there is any leakage, only sterile steam or gas will enter the system. On the other hand, the circular chamber 62' may be subjected to a vacuum, and, in that event, the vacuum will be higher than the vacuum within the system, e.g., 28 to 29 inches, which is higher than the vacuum pan, which is usually 15 to 25 inches. In the case of sterile air, the pressure is about five pounds above atmospheric pressure, and the air need not be hot, but may be at substantially room temperature. In the same manner, when a bactericide mist is used, it may be at substantially room temperature and under a slight pressure or no pressure at all. When steam is introduced, the pressure may be from three to five pounds above atmospheric pressure, and the temperature of the steam on the inside of the jacket can be as low as about 225° F. The steam may be introduced to the seal 62' at temperatures from 230° F. to 240° F., and as high as 300° F.

Figure 3 illustrates a flanged-type seal structure which may be utilized for securely connecting conduits, valves and the like, and joints of all kinds at various locations, within the liquid treating and handling system, e.g., at the cover 24 for the pan, the cover 24' for the tank 31, and the respective connections 83 and 84 at the bottoms of the legs 22 and 23. In this view, the bottom end of inlet leg 22 and inlet thereto in the form of a detachable concentric reducing cone 85 are preferably provided, as by welding, with ring-like opposed flange or joint members 86 and 87 forming sealing surfaces each provided with a series of circular registering complementary and concentric annular recesses or grooves 88, 89 and 90. In the closed and sealing position, ring gasket elements 91 and 92 are provided within recesses 88 and 90 whereby the intermediate complementary recesses 89 form an annular closed chamber 93 extending circumferentially about and surrounding the joint of the coupling or fitting formed by the abutting surfaces of the grooved flanges 86 and 87. The chamber 93, therefore, forms a compartment surrounding the sealed joint or fitting of the conduits and has a port 94 leading to a source of vacuum, as well as additional inlet and outlet ports 95 and 96 for circulating sterile inert gas, or steam, or the like, through the circular chamber 93. The gaskets 91 and 92 may be of any desired material. However, we have found that a rubber impregnated cord material is most desirable.

The connection or fitting shown in Figure 3 is also provided with additional cooling jackets or casings 97 associated with the flange 86 and heating leg 22 and 98 associated with the flange 87 and cone 85, forming respectively annularly extending individual circular closed chambers within which a cooling fluid, such as water, may be circulated whenever sterile steam or other heated medium is utilized within the chamber 93 to maintain the system free of any contaminating agents. The purpose of the cooling means is to avoid overheating of the equipment and also the objectionable effects of overheating the product. Suitable inlets and outlets 99—100 are provided for each cooling chamber for thus circulating the cooling fluid in the chambers. The chambers or cooling jackets 97—98 may be provided with suitable fittings, also not shown, to form an interconnected system including other jackets and casings through which such cooling fluid may be circulated. The connection or fitting of Figure 3 is clamped in sealing relation by means of C-clamps 101 of well-known construction, as shown in Figures 1 and 3, which are pivoted to the lower flange 87 by a pivotal connection including ears 102 and including the wing nut type clamping and tightening bolt 103.

The cone 85 which serves as the inlet for the milk or other fluid delivered to the leg 22 also serves as the outlet when the system is operated batch and it is not desired to use the outlet 25.

The milk is usually led from a sterilizer of the steam ejector or tubular heat exchange tube to the inlet end 85' of the cone 85 and a sterile connection is provided utilizing a valve structure, as described in the pending application of Robert Bundus et al., Serial No. 387,345, filed October 21, 1953, now abandoned, which disclosure is hereby incorporated and made a part of this application.

Figure 4 illustrates a variation of the sealed connection or fitting of Figure 3 by employing flat ring gaskets 104 and 105 in lieu of the oval gaskets 91 and 92. Additionally, bolt and nut clamping elements 106 are utilized for clamping the opposed flange portions of the seal in sealing position, but C-clamps 101 may be used, if desired. In this view, also, the coolant chambers 97 and 98 are shown provided with tubular connections 99 and 100 through which the cooling fluid may be circulated.

Referring to Figure 1, a similar type of sterile seal is provided, as shown in Figures 3 and 4, for the cover 24 of the pan 20. In this construction, the flange 73 of the cover 24 and the flange 74 of the pan are provided with a seal, as shown at 91, 92, 93 or 104, 105, 93 in Figures 3 and 4, and cooling chambers 75 and 76 with inlet and outlet ports similar to chambers 97 and 98 are also provided whereby when a heating medium is circulated in the passage 93, overheating of the pan and also the effects of overheating the contents, are overcome by circulating a cooling medium through the passages 75 and 76.

It will be noted that the cover 24 of the pan and the cover 24' of the weigh tank 31 are hingedly mounted and provided with a suitable weight 107 to assist in opening these covers. The covers 24 and 24' are preferably held tightly sealed by hinged C-clamps of conventional design, as shown at 101 in Figure 3. The cover and seal structure of the weigh tank 31 is substantially identical with that of the closure 24, and pan 20, just described, i.e., similar to the seals shown in Figures 3 and 4, except that no cooling passages 97—98 are necessary.

Figures 5 and 6 (and with further reference to Figure 1) illustrate a connection or fitting similar to that illustrated in Figures 3 and 4, of the type particularly useful, for example, for application to the closure 84' at the lower end of the condenser leg 23. With reference to Figures 5 and 6, the closure 84' and lower portion of the condenser 23 are shown provided with opposed flange-like sealing surfaces 108 and 109 corresponding to the flanges 86—87 of Figure 3, and having complementary recessed portions 88, 89 and 90, as described in connection with Figure 3. In Figures 5 and 6 the sealing jacket 93 surrounding the connection or fitting receives the sterile inert gases, vacuum or sterile steam. Passages 97—98 for circulating a cooling fluid are optional on the condensing leg 23.

The lower end 110 of leg 23 has outwardly extending brackets or ears 11, as shown in Figure 6. The closure 84' has arms 112 fixed theerto, as at 113. These arms have fixed lugs 114 pivoted at 115 in the ears 111 whereby the closure 84' may be moved into and out of closed position with respect to the leg 23. The arms 112 carry a weight 116 which will help in keeping the closure in the closed position shown in Figure 1. C-clamps, as shown in Figure 3, may also be used to keep the closure in sealed position.

The constructions shown in Figures 3 to 6 are used in connection with the cover 24, the cover 24' for the tank 31, as well as the closure for the bottom portions of the inlet leg 22 and outlet leg 23. That is, the construction in each instance provides a seal 93 upon which may be imposed a vacuum or a pressure condition by means of super-heated or saturated steam, or sterile gas or a bactericidal mist, as previously described. The gaskets which surround the circular seal or jacket 93 afford an air-tight connection with the flange connections, as previously described in connection with Figures 3 to 6, and suitable cooling means, such as the chambers 97 and 98 are provided where a heated medium is employed which might unduly heat the vacuum tank and thereby unduly and objectionably heat the milk or other substances being concentrated.

*Operation of the preferred embodiment*

As indicated heretofore, the vacuum pan apparatus of the preferred embodiment may be connected to and associated with other liquid-treating apparatus or zones of treatment by a valve structure, as presented in the copending application of Robert H. Bundus et al., Serial No. 387,345, filed October 21, 1953, for Valve Structure for Apparatus for Handling Fluids Under Sterile Conditions. The cone 85 has its inlet 85' connected to such a valve structure which also is used in connection with valves 43, 46 and 48 and any other connections which might be subject to contamination. The use of the valve of the said Bundus et al. application in connecting the sterilizer to the reducing cone 85 allows the fluid, such as milk, to be passed from a zone of pressure, e.g., the sterilizer, into an area of low pressure, namely, the vacuum pan, without likelihood of external seeping or leakage.

As mentioned above, the internal portions of the system, as well as the external portions of the system, will be sterilized simultaneously by saturated steam, after the vacuum pan and associated apparatus has been scrubbed clean and assembled. The jackets or casings surrounding the fittings and connections of the system will have saturated steam circulated therethrough at a pressure in excess of atmospheric pressure, e.g., 15 pounds or more. The steam, if desired, can be replaced by bleeding in hot sterile air or gas through the sterile air valve 46 which also is used to break the vacuum in the batch operation, as above-described, and gradually increasing the proportion of sterile air, thereby sweeping out all residual steam and droplets of moisture which have collected in the jacket or encased portions of the fittings and connections and avoid initial formation of vacuum due to condensing steam.

Sterilization of the vacuum pan apparatus, after it has been scrubbed and assembled, is effected by admitting the steam, under pressure, into the chamber 20 of Figure 1, by means of the port 20'. During the internal treatment of the vacuum pan apparatus with the steam, condensate is withdrawn from the chamber 20 through the concentrated product outlet 27 and conduit 25, as well as the condenser leg 23. Such concentrate, in the case of milk, has a temperature between about 110° and 120° F. The portion of the steam withdrawn through the conduit 25 may be passed to a closed sterile receptacle and preferably is carried on to a further liquid-treating zone, such as a sterile packaging instrumentality, such as a Martin Aseptic Filling Head (as shown, for example, in Patent 2,549,216), which is commercially available, while the condensed steam withdrawn through the condenser 23 may be passed through suitable conduits to the atmosphere or to the tank 31 and removed therefrom.

The apparatus of the preferred form of our invention is operated either under the batch or continuous method or system, and prior to the admission of liquid to be concentrated, the chamber 20 is evacuated by a steam or air ejector 28 and condenser 23 which are used to continuously maintain a vacuum approaching about 26 to 28 or 29 inches within the chamber.

If the liquid to be concentrated is at the proper concentrating temperatures, such liquid will be admitted through the inlet leg 22 passing out through the opening 22' therein and directed toward the upper portion of the chamber 20 and underneath the deflector or hood 34. It is desirable to elevate the temperature of the incoming liquid in leg 22, and a suitable heating medium may be continuously passed through the heat exchanger 22, such as steam, hot air, hot water, etc.

Liquid entering the chamber 20 through the inlet 22 will, upon entering the vacuum pan, be directed by the hood downwardly, as shown at 36 in Figure 1, and have the volatile portions thereof rapidly evaporated or flashed, such vapors passing toward the upper portion of the chamber to be withdrawn under the action of the ejector 28 and reduced pressure created by condensing of the steam and vapors in the condenser leg 23, wherein the vapors are liquefied. Such liquid resulting from the condensation of the vapors formed in the chamber 20 will be delivered to a measuring and collecting chamber 31 for further processing. After a desired quantity of liquid to be concentrated has been introduced into the chamber 20 the flow of the liquid therein will be discontinued. Partially condensed liquid collected in the lower portion of the chamber 20 at this time may be recirculated from the chamber 20 to the inlet leg 22 through outlet 25 in advance of the heater 22, to be reheated to concentrating temperature and then be re-introduced into the chamber 20. This re-cycling of the material undergoing treatment is effected by thermocirculation from applied heat in heater leg 22, and results in a higher degree of concentration in which a greater portion of the volatile components are vaporized and subsequently condensed and collected.

After the desired degree of concentration has been effected, as can be readily determined by weighing the condensed vapors in tank 31 on scale 32, for comparison with the amount of whole liquid previously introduced to the vacuum pan apparatus, the vacuum is broken by sterile air introduced through valved port 45, and the concentrated liquid can then be delivered in its entirety through the outlet 25 to leg 22 and may also be removed through outlet 27, under the action of gravity for further handling operations, such as a sterile packaging instrumentality.

The valve structure disclosed in the above-mentioned copending application of Bundus et al. is well adapted for directing the flow of liquid to and from the vacuum pan apparatus and, as stated, is preferably employed with the preferred embodiment of our invention.

It will be understood that, although the condensed vapors are liquefied primarily to determine the extent of concentration effected within the chamber 20, such liquid may be further analyzed by any additional testing procedure.

As described, the vacuum pan may be operated in continuous system by utilizing the outlet 25 with Cobalt Ray Equipment to measure the density of the concentrate, the concentrated liquid being delivered directly from the outlet 25 through the outlet 27. This removal of the concentrate is obtained by gravity or sterile air pressure created by sterile air introduced under pressure at the valved port 45, but if desired, a sterile pump may be utilized.

*Summary*

It will thus be seen that the objects of the present invention have been carefully and effectively fulfilled by improved apparatus and methods for the sterile treatment and handling of liquid products within a system maintained free of contaminating and detrimental influence and agents.

The improved concentrating apparatus and methods hereinbefore presented, together with the sealed connections and fittings, the cooling system for insulating the pan and liquid product from heat and the measurement and processing of the concentrate and condensate during and after concentration of the liquid, produce a concentrated product of a quality heretofore unknown which may be kept without refrigeration for extended periods of time.

It will be realized that the embodiment of our vacuum pan apparatus and methods of operating the same are disclosed for the purposes of disclosing the principles of the invention and are susceptible to various changes without departing from such principles. Therefore, this invention embraces all modifications encompassed by the spirit and the scope of the following claims.

We claim:

1. An evaporator structure comprising a tank having a top opening and a cover therefor, heat exchangers each communicating with said tank at spaced points, a connection between said cover and the body of the tank, connections between said heat exchangers and conduits leading respectively thereto, each of said connections being provided with a hollow sealed passage surrounding the said connections, means for maintaining a differential sealing pressure with respect to the pressure in the tank and the pressure in said hollow sealed passages, one of said heat exchangers having means for heating fluid as it passes therethrough to the tank, the other of said heat exchangers having means for condensing vapors as the same pass therethrough from the tank, means for creating a reduced pressure in the tank to cause vapors formed in the tank to travel to and be condensed in said last mentioned vapor condensing heat exchanger, said heat exchangers opening into the tank adjacent the top opening whereby the tank and said heat exchangers are accessible through said top opening.

2. An evaporator structure according to claim 1 wherein said tank is provided with outlet means, said outlet means communicating with the passageway for fluid in the said heat exchanger which has means for heating the fluid as it passes therethrough to the tank.

3. An evaporator structure according to claim 1 in which the said means for maintaining a differential pressure in said sealed passages maintains a pressure greater than atmospheric pressure in said passages.

4. An evaporator structure according to claim 1 having an outlet disposed at the bottom of the tank for removing concentrated material from the tank.

5. An evaporator structure according to claim 1 wherein certain of said connections are provided with cooling jackets for circulating cooling medium about the connections to reduce overheating.

6. An evaporator structure according to claim 1 wherein said heat exchangers are inclined with respect to the wall of said tank and each has an inclined end opening within said tank.

7. An evaporator structure according to claim 1 provided with a port communicating with said tank and having a valve, said port and valve providing means for introducing air to break a reduced pressure condition in said tank.

References Cited in the file of this patent

UNITED STATES PATENTS

| | | |
|---|---|---|
| 277,012 | Dinkel | May 8, 1883 |
| 378,843 | Lillie | Feb. 28, 1888 |
| 393,381 | McSweeney | Nov. 27, 1888 |
| 521,974 | Cooper | June 26, 1894 |
| 871,421 | Koppers | Nov. 9, 1907 |
| 1,213,596 | De Baufre | Jan. 23, 1917 |
| 1,733,476 | Vogelbusch | Oct. 29, 1929 |
| 1,803,969 | Huff | May 5, 1931 |
| 1,814,927 | Hock | July 14, 1931 |
| 1,833,379 | Kermer | Oct. 18, 1932 |
| 1,902,110 | Urich | Mar. 21, 1933 |
| 1,994,169 | Comins | Mar. 12, 1935 |
| 2,063,166 | Jansse | Dec. 8, 1936 |
| 2,183,907 | Fischer et al. | Dec. 19, 1939 |
| 2,236,087 | Detwiler | Mar. 25, 1941 |
| 2,247,105 | Tinker | June 24, 1941 |
| 2,338,227 | Boeckeler | Jan. 4, 1944 |
| 2,490,750 | Grewin et al. | Dec. 6, 1949 |
| 2,492,409 | Worn et al. | Dec. 27, 1949 |
| 2,507,360 | Wicks | May 9, 1950 |
| 2,527,084 | Smith | Oct. 24, 1950 |
| 2,533,868 | Anderson | Dec. 12, 1950 |
| 2,545,886 | Kooistra | Mar. 20, 1951 |
| 2,551,750 | Liskey | May 8, 1951 |
| 2,576,843 | Lockman | Nov. 27, 1951 |
| 2,584,973 | Andermatt | Feb. 12, 1952 |
| 2,624,488 | Pritchard | Jan. 6, 1953 |
| 2,647,570 | Lockman | Aug. 4, 1953 |
| 2,677,252 | Rice et al. | May 4, 1954 |
| 2,691,460 | Barnebey | Oct. 12, 1954 |
| 2,757,225 | Dunn | July 31, 1956 |
| 2,768,813 | Boyer | Oct. 30, 1956 |
| 2,800,955 | Honig et al. | July 30, 1957 |

FOREIGN PATENTS

| | | |
|---|---|---|
| 83,132 | Austria | Mar. 10, 1921 |

OTHER REFERENCES

"Condensed Milk and Milk Powder," 6th ed., by Hunziker (1946), pp. 69–73, inclusive.